(12) United States Patent
Du Toit

(10) Patent No.: US 7,862,762 B2
(45) Date of Patent: Jan. 4, 2011

(54) MOULDING OF MOULDABLE MATERIALS

(75) Inventor: Pieter Wouter Du Toit, Northern Paarl (ZA)

(73) Assignee: Lomold Corporation NV, Curacao (AN)

( * ) Notice: Subject to any disclaimer, the term of this patent is extended or adjusted under 35 U.S.C. 154(b) by 277 days.

(21) Appl. No.: 10/204,010

(22) PCT Filed: Feb. 14, 2001

(86) PCT No.: PCT/ZA01/00016

§ 371 (c)(1),
(2), (4) Date: Oct. 31, 2002

(87) PCT Pub. No.: WO01/58660

PCT Pub. Date: Aug. 16, 2001

(65) Prior Publication Data

US 2003/0102599 A1    Jun. 5, 2003

(30) Foreign Application Priority Data

Feb. 14, 2000 (ZA) .................................. 00/0693

(51) Int. Cl.
*B29C 45/46* (2006.01)
(52) U.S. Cl. .................. 264/328.18; 264/328.8; 264/211.23
(58) Field of Classification Search ............ 264/328.18, 264/211.23, 328.8; 425/560, 561, 581, 571
See application file for complete search history.

(56) References Cited

U.S. PATENT DOCUMENTS

| | | | | |
|---|---|---|---|---|
| 3,049,757 A | * | 8/1962 | Hagerborg | 425/586 |
| 3,417,433 A | * | 12/1968 | Teraoka | 425/559 |
| 4,389,358 A | * | 6/1983 | Hendry | 264/45.1 |
| 4,508,595 A | * | 4/1985 | Gasland | 162/158 |
| 4,906,424 A | * | 3/1990 | Hughes et al. | 264/645 |
| 5,043,129 A | * | 8/1991 | Sorensen | 264/297.2 |
| 5,310,330 A | * | 5/1994 | Zweig et al. | 425/116 |
| 5,454,995 A | * | 10/1995 | Rusconi et al. | 264/328.8 |
| 5,653,534 A | * | 8/1997 | Matsumoto et al. | 366/76.1 |
| 5,728,337 A | * | 3/1998 | Yoshikawa et al. | 264/102 |
| 6,071,462 A | | 6/2000 | Putsch | |

(Continued)

FOREIGN PATENT DOCUMENTS

WO    WO 86/06321    * 11/1986

(Continued)

OTHER PUBLICATIONS

Rosato, Dominick V., Donald Rosato, and Marlene Rosato. Injection Molding Handbook (3rd edition). Boston: Kluwer Academic Publishers. 2000. pp. 170-173, 175, 193, 194.*

(Continued)

*Primary Examiner*—Monica A Huson
(74) *Attorney, Agent, or Firm*—Connolly Bove Lodge & Hutz LLP

(57) ABSTRACT

A method of moulding and a moulding installation is disclosed. The installation comprises a compounder (16), a flow path (26) from the compounder to a vessel (34) in which the mouldable material emerging from the compounder is accumulated, and further flow paths (28) from the vessel (34) to a number of moulders (30) each of which is associated with a mould (32). The moulders take charges of mouldable material on a cyclical basis.

19 Claims, 3 Drawing Sheets

U.S. PATENT DOCUMENTS 6,464,910 B1 * 10/2002 Smorgon et al. ............ 264/40.5
6,558,603 B2 * 5/2003 Wobbe et al. ............ 264/297.2
6,699,422 B1 * 3/2004 Stemke .................... 264/328.4

FOREIGN PATENT DOCUMENTS

| WO | WO 98/09786 | * | 3/1998 |
| WO | WO 98/09786 A1 | | 3/1998 |
| WO | WO 00/06359 | * | 2/2000 |
| WO | WO 00/06359 A1 | | 2/2000 |
| WO | 00/37233 | | 6/2000 |

OTHER PUBLICATIONS

Translation of WO 00/37233 (Alta Vista: Babel Fish).*

* cited by examiner

MOULDING OF MOULDABLE MATERIALS

FIELD OF THE INVENTION

THIS INVENTION relates to the moulding of mouldable materials such as synthetic plastics materials and ceramics.

BACKGROUND TO THE INVENTION

Most synthetic plastics materials are derived from the raw polyolefins which are byproducts of the catalytic cracking of crude oil and the production of oil from coal. Raw polyolefins are in the form of powders comprising particles and lumps of various sizes. Chemical companies such as BASF and Bayer polymerise the raw polyolefins into a range of synthetic polymers usually without any fillers. Polymerisation occurs as a result of the application of heat and pressure. The nature of the resultant polymer depends on the degree to which the raw polyolefin is polymerised. Companies, which are often simply referred to as "compounders", purchase this raw material and mix it with fillers such as talc, flame retardants, pigments and fibres. This is usually done by re-melting the raw material in a heated barrel which has two extruder screws therein. The two screws are parallel and side by side in the barrel and there can be one or more feed hoppers which feed fillers to the barrel. The screws mix the fillers and polymer as well as raise the temperature of the materials by a kneading action as the screws rotate.

The mixed, molten material which emerges from the barrel is fed as a rope through a cooling bath and then to a chopper that cuts the rope into pellets. The pellets are cut into lengths of up to about 25 mm. If the pellets have fibres in them, the pellet length and the maximum fibre length are substantially the same. This process results in plastics material pellets which contain the requisite additives.

For other uses the mixed molten material is fed through a silt like nozzle and extruded into the form of a continuous web. The web passes through a bath where it cools and sets. The web is then cut into sheets.

If the material is in pellet form it is bagged and shipped to the end user. End users are often referred to as converters. Most of the pellets produced as described above are used by feeding them to an injection moulding machine.

The first injection-moulding machine patent known to applicant was granted in the US in 1872 to John Hyatt. Almost three-quarters of a century later a major development occurred when William H Wilbert developed the reciprocating screw plasticiser for injection moulding machines. The patent was granted in 1956, injection moulding is principally a mass production method due to the required capital investment in machines, moulds and auxiliary equipment.

Before the advent of injection moulding compression moulding was the most important processing method for synthetic plastic materials. By 1960 the major processes in the plastics industry were injection moulding and extrusion. Twenty years later a wide variety of methods existed but injection moulding remained the dominant mass production technology for synthetic plastic components.

In the injection moulding process a synthetic plastics material, normally in pellet form, is added to the injection unit where it is subjected to the mixing and shearing action of a screw to provide a molten homogeneous mix. The mould is closed by a clamping unit. After complete closure of the mould the molten material in the injection unit is pushed forward through a sprue, a runner system and one or more gates into the mould cavity until the cavity is filled. The injection unit maintains pressure on the material whilst the material in the mould cavity cools and the material at the gate(s) solidifies. At that stage the plastisicing process recommences and the screw moves back to the position it occupied before injection. Plastisicing, metering and injection are all carried out by the injection unit. Because the mould is fully closed when the molten material is injected, components with holes, undercuts etc can be made.

The process is characterized by the high clamping force required to keep the mould closed during filling of the mould cavity. The pressure can be reduced significantly by increasing the gate size but this increases the cycle time and the "witness" mark at the injection point.

To reduce the clamping force required, the moulds are in some machines kept open slightly. The material is then injected into the mould at a lower pressure and a lesser force is required to close the mould and complete the injection cycle. This method is referred to as injection compression moulding. Although the clamping pressure requirement is reduced, the process is limited to components without holes and undercuts. The shape of the components is limited by the relative movement of the two mould halves in the opening and closing direction. Product features dependent on the movement of mould components in a third dimension cannot be incorporated.

A further inherent limitation of the injection moulding process is in the moulding of long fibres into the product being made. The length of the pellet feedstock limits the initial length of the fibres. The average length of fibres in the material is further reduced by the plasticising process, by the high-pressure flow in the runners and by entry of the material into the mould cavity through the gate. Furthermore, the addition of fibres to the mouldable material decreases the flowability of the material. This significantly increases the clamping force requirements of the machine as injection at higher pressures is necessary to cause the material to flow. In addition, the abrasive action of fibres forced at high pressure through small passages significantly increases wear. It is for this reason that components requiring long fibres for strength are manufactured by processes such as the compression moulding process.

A significant difficulty with the injection moulding of certain articles is that the extraneous piece of material that comes out of the mould with the article, and which solidified in the sprue, must be trimmed-off. Where the article is of fibre filled material this cannot always be done by hand as the material is too hard. Hence machinery must be provided for removing the extraneous material.

The area around a sprue usually requires more time for cooling purposes than the rest of the article and this increases cycle time. Furthermore stresses and weakened zones can occur around the sprue.

Recent improvements in the productivity and cost effectiveness of the injection moulding process include the addition of a compounder. The compounder melts and mixes the mouldable material. The compounder feeds a number of "injection pots" each associated with clamping unit and mould. The injection pot comprises a barrel with a piston in it, the piston being reciprocable in the barrel. The barrel is closed at one end apart from a narrow sprue which leads to a runner system and then to the gate or gates at the mould cavity entrance(s). The molten material is transported from the compounder to the barrel of the injection pot by external hot runners. A valve at the entrance to the injection pot closes during the injection cycle. During the injection cycle the piston pushes a predetermined proportion of the molten material in the barrel through the sprue, runner system and gate(s). The pressure requirements remain the same as in injection moulding since no changes have been made to the way in which the material flows into the mould. Fibre breakage in the sprue, runner system and gate(s) is still present. There is a residual amount of material in the barrel at the sprue end after the injection part of the cycle.

The pellets can also be used in what is known as predetermined weight (or volume) compression moulding. In this form a slug or predetermined weight of molten material is placed into an open mould. The clamping pressure exerted when the mould is closed forces the molten mouldable material to spread out and fill the mould cavity. This method has the disadvantage that it cannot make an article with complex geometry and it is not possible to form either holes or undercuts in the article being moulded.

Compounders have lately also made their way into the compression moulding market. Long fibre-reinforced material is compounded, weighed and then placed into an open mould by a robot. The mould is closed and the component is formed by the mould halves which clamp the material between them. Material which when hot is sensitive to light, air or humidity cannot be moulded in this way as it is exposed to the atmosphere before it reaches the mould. Also, the shapes of the products produced are limited as in the case of injection compression moulding.

Sheets produced as described above can be used in processes such as vacuum and thermo forming or sheet web moulding which is another type of compression moulding. The heated sheet is placed in the mould whilst the mould is open, and the mould then closed to deform the soft sheet to the required shape. The resultant product, after cooling and solidifying, is known as a blank. Only simple shapes can be made by this method. Should holes be required in the part being manufactured then these are subsequently stamped out in a press. The blank must be positioned exactly in the press to ensure that the holes are in the correct place. There are normally trimming and finishing requirements on the stamped blank. This is particularly necessary if the sheet is fibre reinforced as stray fibres are usually left protruding from the cut edges. The pieces stamped out are normally recycled.

Compression moulding using sheet material cannot be employed for what is known as "In mould skin decoration". This technique involves placing a layer of fabric a layer of paint skin or a layer of another material such as a glass fibre mat in the mould and moulding plastics material onto the back of it. The moulded-on material carries the layer and imparts the necessary strength to it. The difficulty which arises is that as the mould closes the sheet deforms and shifts, displacing the layer out of its intended position and possibly causing it to wrinkle.

Injection moulding has been employed to achieve in-mould decoration. However the high pressure of the incoming material can cause burn-through and can also cause the decorative layer to shift. The decorative layer has to be made thicker in order to avoid these difficulties.

It will be understood that energy is used when the compounding company melts the raw olefins to form the pellets or web. Further energy is used to melt the pellets to create a molten mass that can be moulded or to heat the sheet so that it can be formed to the requisite shape.

In the production of ceramic articles a green body is formed which is then sintered to achieve hardness and stability of shape. The mouldable material comprises the clay itself and a number of additives including water which enhance the properties of the raw clay and permit it to be moulded.

The additives and clay can be mixed in a compounder, with or without heating.

Techniques involving moulding using metallic powders mixed with a binder are in the process of development. These result in metal products which can be porous in nature.

The present invention seeks to provide an installation for, and a method of, manufacturing moulded articles which overcome shortcomings of the moulding and forming methods discussed above.

BRIEF DESCRIPTION OF THE INVENTION

According to one aspect of the present invention there is provided a method of manufacturing a moulded article, the method comprising compounding a mouldable material and at least one filler in a compounder to provide a supply of mouldable material in which the filler is distributed, mouldable material with the filler distributed therein feeding out of the compounder and along a feed path leading from said compounder to a holding cavity which communicates with the mould cavity of a mould, and urging the filled mouldable material out of the holding cavity and into the mould cavity by advancing a piston in a forward stroke from a retracted position to a forward position, the face of said piston which is leading during said forward stroke becoming part of the bounding wall of said mould cavity upon it reaching the limit of said forward stroke.

The method can comprise closing the mould before urging mouldable material into said mould cavity from the holding cavity. Alternatively, the mould can be closed after flow of mouldable material into the mould cavity from the holding cavity has commenced.

The fillers chosen depend on the nature of the end product. For example, the filler can comprise reinforcing fibres such as natural fibres, glass fibres, carbon fibres etc. Alternatively, or in addition, the filler can be in the form of particulate material such as wood chips or chips of another material.

Preferably said mouldable material and filler are mixed by feeding them to a barrel which has therein a pair of screws. Where the filler is a fibre the method can include the step of feeding a roving to said barrel.

Where said mouldable material is a synthetic plastics material the method can include steps of melting the material in the compounder, feeding the molten mouldable material with filler dispersed therein to a heated vessel which maintains the mouldable material in its molten condition, and feeding molten mouldable material with filler dispersed therein from said vessel to said holding cavity. The desirable features of the invention are best achieved by feeding the molten mouldable material with filler dispersed therein from said vessel to at least two holding cavities sequentially.

The method can also include the step of displacing the holding cavity from a first position which the holding cavity occupies whilst mouldable material with filler dispersed therein is fed into it to a second position in which it is in communication with said mould cavity, said piston urging said mouldable material with said filler dispersed therein out of the holding cavity whilst said holding cavity is in said second position. Alternatively, the method can include the step of feeding a measured charge of mouldable material with filler dispersed therein to said holding cavity between said piston and the mould cavity and thereafter displacing the piston in its forward stroke.

To obtain an article carrying "in-mould" skin decoration a layer can be placed in the mould cavity before urging the mouldable material into the mould cavity onto the back of the decorating layer.

The mouldable material can be a clay compounded with water, or a metallic powder compounded with a binder.

According to a further aspect of the present invention there is provided an installation for manufacturing a moulded article, the installation comprising a compounder which provides a supply of mouldable material with filler dispersed therein, a holding cavity, means defining a flow path from the compounder to the holding cavity along which path mouldable material with filler dispersed therein flows to the holding cavity, a mould having an open condition and a closed condition, the mould defining a mould cavity, an opening which places said holding cavity in communication with said mould cavity, and a piston which has a front face and is displaceable in a forward stroke from a retracted position to a forward position, said piston displacing the mouldable material with filler dispersed therein out of said holding cavity and into said mould cavity through said opening as it performs said forward stroke, the front face of said piston when it is in said forward position forming part of the bounding wall of said mould cavity.

Said compounder preferably comprises a barrel and a pair of parallel screws in the barrel for kneading and mixing the mouldable material and filler.

Where the material is a synthetic plastics material the installation can include a heated vessel in said flow path for receiving molten mouldable material with filler dispersed therein from the compounder and maintaining it in a molten state. Preferably there are at least two holding cavities and means for feeding molten mouldable material with filler dispersed therein from said vessel to said holding cavities in sequence.

In one form the installation includes means for displacing said holding cavity between a first position that it occupies whilst being filled with mouldable material with filler dispersed therein and a second position in which it communicates with said mould cavity. In another form said holding cavity is constituted by part of a barrel in which said piston reciprocates, said part being between said opening and said piston. In this latter form there can be a valve which can be opened and closed to control communication between said holding cavity and said mould cavity, said holding cavity being filled whilst the valve is closed to provide a measured charge. In another form there are means for delivering a measured quantity of mouldable material with filler dispersed therein to said holding cavity.

BRIEF DESCRIPTION OF THE DRAWINGS

For a better understanding of the present invention, and to show how the same may be carried into effect, reference will now be made, by way of example, to the accompanying drawings in which:—

DETAILED DESCRIPTION OF THE DRAWINGS

In the specifications of PCT applications Nos. PCT/US97/15673 (published as WO98/09786) and PCT/ZA99/00057 (published as WO 00/06359) various structures are disclosed for moulding inter alia synthetic plastics materials. The disclosures of these two PCT specifications are hereby incorporated into the present specification.

Figure 1:
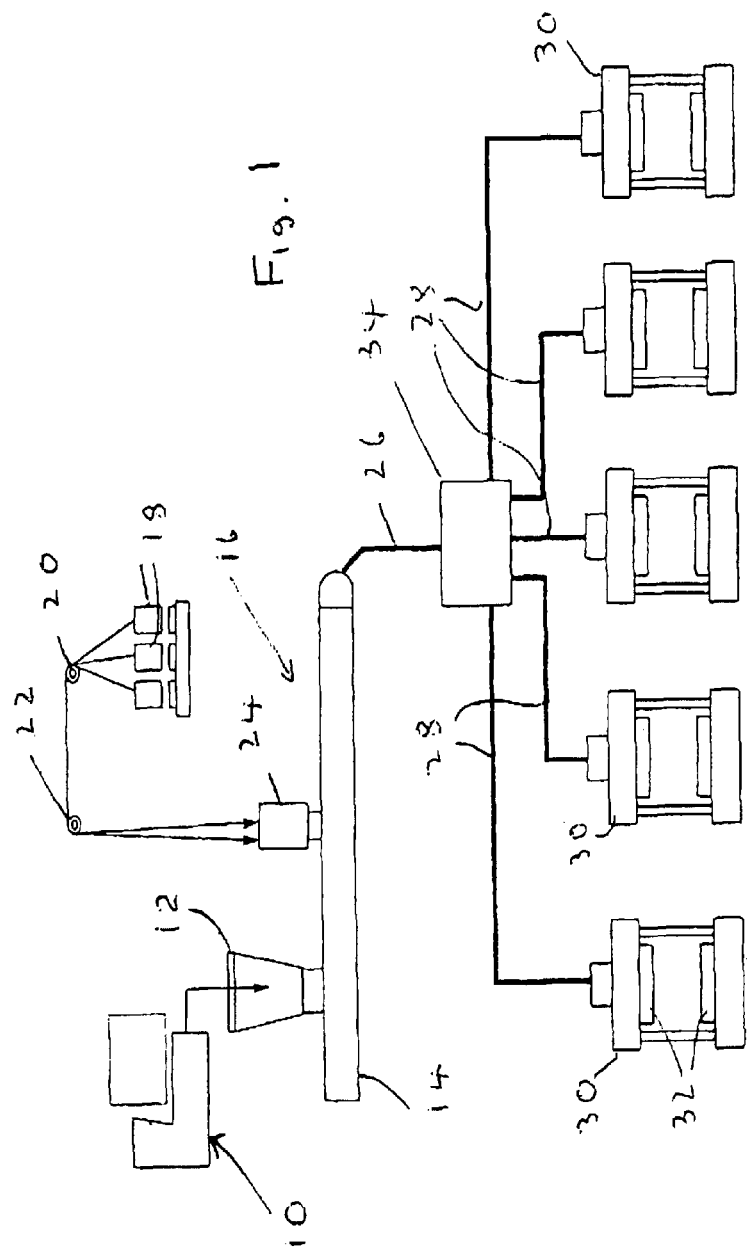
FIG. 1 diagrammatically illustrates an installation in accordance with the present invention.

Referring firstly to FIG. 1, the installation illustrated comprises a gravimetric metering device 10 which provides a stream of pellets to a hopper 12. The hopper 12 at its lower end communicates with the heated barrel 14 of a compounder generally designated 16. Within the barrel there are parallel twin screws which exert a kneading action on the pellets. The pellets melt in the barrel and form a homogeneous mass.

Spools or cans are shown at 18 and these each carry or contain a roving. The roving can be of, for example, glass fibre, or a natural fibre such as cotton or carbon fibre. Any fibre that is desired to disperse in the molten mass as a filler can be used. The rovings pass over guide rollers 20 and 22 and enter the barrel 14 through a draw-off arrangement 24 which drags the rovings off the spools or out of the cans and feeds them into the barrel 14. There is inevitably some breaking down of the fibres in the barrel. It is also possible fort the arrangement 24 to include a chopper which cuts the roving to the desired length.

It will be understood that, in addition to or instead of the fibre filler, particulate material such as wood chips can be added as fillers at the compounder.

The German firm of Werner and Pfleiderer supplies suitable twin screw compounders under the designation "Megacompounders from WP".

A flow path generally designated 26, 28 leads from the compounder 16 to a series of moulders 30 each of which is associated with a mould 32 defining a mould cavity. The moulders will be described in more detail hereinafter with reference to FIGS. 2 to 5.

The twin screw compounder 16 runs continuously and hence there is a constant stream of molten material with filler dispersed in it emerging from the barrel 14. Each moulder 30 takes shots of material at intervals which depend on the cycle time. Thus there is intermittent flow along the parts 28 of the flow path and continuous steady flow along the part 26. A vessel 34 receives and accumulates the material flowing continuously from the compounder 16 and maintains it in a molten state.

Figure 2:
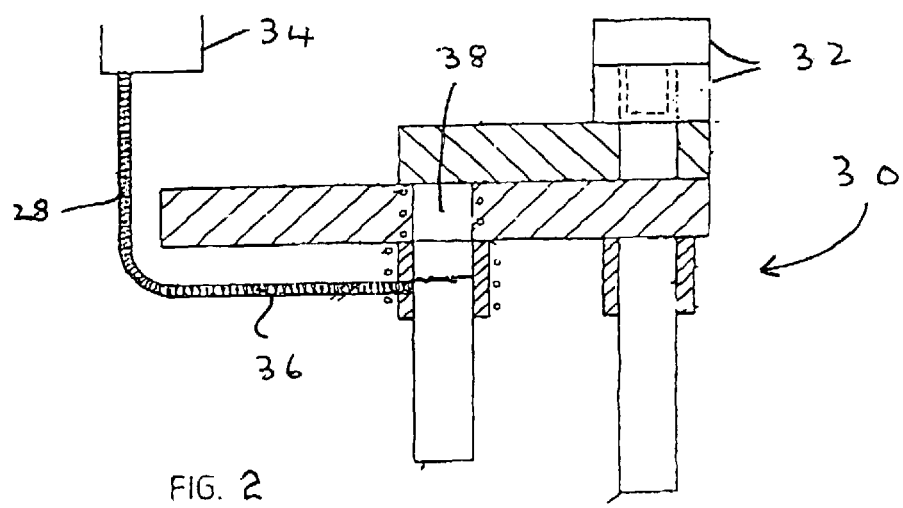
FIGS. 2 and 3 illustrate moulding apparatus in two operative conditions, these Figures being FIGS. 1 and 2 respectively of WO98/09786.
Figure 3:
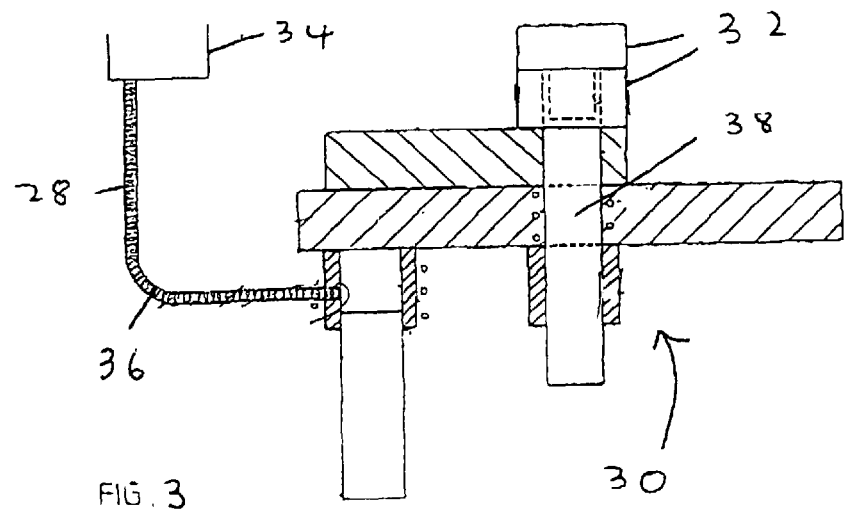

In FIGS. 2 and 3 the vessel 34 is shown as well as the flow path 28. In the path 28 there is a feed screw 36. This runs each time a shot of mouldable material is required and serves to withdraw the material from the vessel 34 and feed it to a holding cavity designated 38 of the moulder designated 30.

Figure 4:
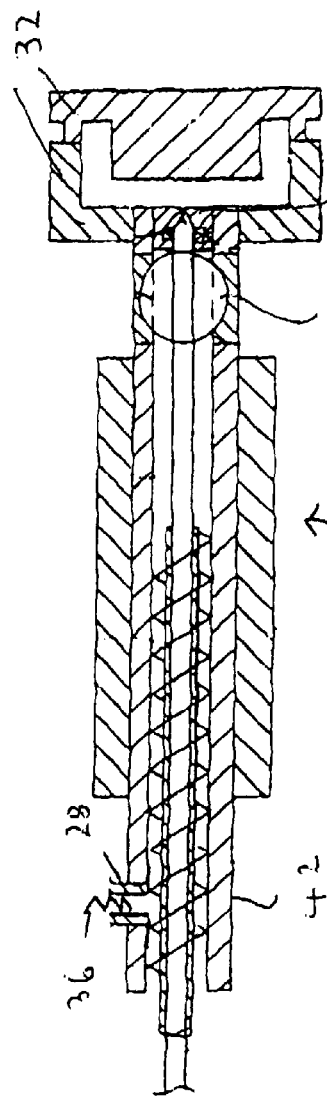
FIGS. 4 and 5 illustrate a further form of moulding apparatus in two different conditions, these Figures being FIGS. 1 and 2 respectively of WO/99/00057.
Figure 4:
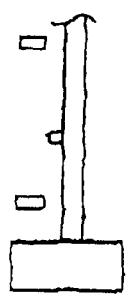
Figure 5:
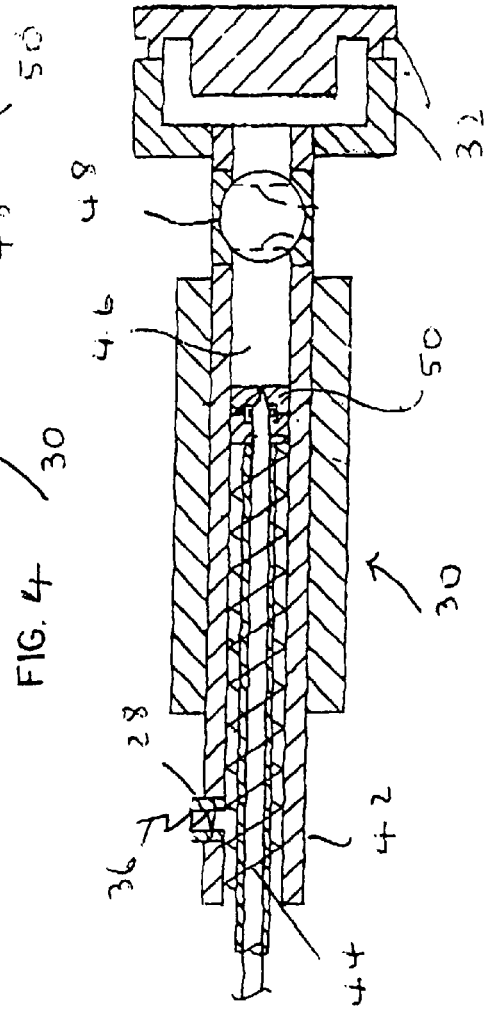
Figure 5:
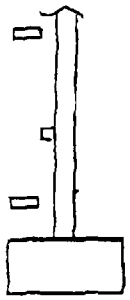

In FIGS. 4 and 5 a short length of the flow path 28 and the screw 36 are shown as well as the moulder 30. The flow path enters a barrel 42. A screw 44 in the barrel feeds material to a holding cavity 46 which is between a valve 48 and a piston 50. The mould is shown at 32. The piston, when it moves from the position of FIG. 5 to the position of FIG. 4, passes through the open valve 48 and forces the mouldable material out of the holding cavity 46 and into the cavity of the mould 32.

In both forms of moulder described in relation to FIGS. 2 to 5, the leading face of the piston during its forward stroke becomes part of the bounding wall of the mould cavity. There is consequently no sprue, runner system or gates. The holding cavity in each of FIGS. 2 and 3 is of constant cross section throughout its length and the opening through which the holding cavity opens into the mould cavity is of the same cross sectional dimensions as the holding cavity.

Likewise, in FIGS. 4 and 5, the cross sectional shape and area of the barrel are the same as that of the piston and constant throughout that part of its length which extends from the point to which the piston 50 retracts (FIG. 5) to the opening through which it communicates with the mould cavity. The opening is of the same shape and cross sectional dimensions as the barrel.

The term "filler" as used herein covers both what are generally referred to in the art as additives and also what are generally referred to in the art as fillers. The word filler thus encompasses the following:—

Antioxidants
Lubricants
Stabilizers
Pigments
Impact modifiers
Flame retardants
Natural fibres (cotton, flax, sisal, hemp)
Mineral fillers (Including spherical or other shapes of metal additions)
Organic fillers
Natural fillers (Wood chips, cotton stems, etc)
Antistatic agents
Blowing agents
Compatibilisers
Plasticisers
Synthetic fibres (carbon, glass, kevlar, nylon, polyester)
This list is not intended to be exhaustive.

These are incorporated into the polymer to modify its behaviour during processing or to impart the desired characteristics to it after moulding.

Fibres are added to improve the stiffness and strength of the final product. Dimensional stability is improved and in the case of some rubbery compounds better green strength is obtained. Characteristics such as creep resistance, ageing and weathering properties can be enhanced.

If the installation is to produce ceramic articles the clay with water and one or more dispersed fillers is fed from the compounder 16 into the part 26 of the flow path. Thereafter its treatment is as described above in relation to mouldable synthetic plastics materials. Similarly if metal parts are to be produced, metal in particulate form and a binder for the particles emerge from the compounder.

The invention claimed is:

1. A method of manufacturing moulded articles, the method comprising the steps of:
   continuously running screw means in a barrel;
   feeding mouldable material to said barrel;
   plasticizing the mouldable material in said barrel in a single plasticizing procedure;
   incorporating reinforcing fibres in the mouldable material as the plasticizing procedure proceeds and
   providing a continuous supply of mouldable material with said fibres dispersed in it;
   directing the mouldable material with said fibres into first and second barrels, sequentially;
   urging the mouldable material with said fibres out of the first barrel and into a first moulding cavity by advancing a first piston along the first barrel in a forward stroke from a retracted position to a forward position, the face of the first piston which is leading during the forward stroke becoming part of the bounding wall of the first moulding cavity upon the first piston reaching the limit of its forward stroke; and then
   urging the mouldable material with said fibres out of the second barrel and into a second moulding cavity by advancing a second piston in a forward stroke along the second barrel from a retracted position to a forward position, the face of the second piston that is leading during the forward stroke becoming part of the bounding wall of the second moulding cavity upon the second piston reaching the limit of its forward travel;
   the pistons being advanced after the directing of the mouldable material with said fibres to the associated barrel.

2. A method as claimed in claim 1, wherein the screw means comprises a pair of screws.

3. A method as claimed in claim 1 and comprising feeding mouldable material sequentially into holding cavities constituted by portions of the barrels which are between the pistons when retracted and the moulding cavities so that each holding cavity is filled in turn, and sequentially advancing the first and second pistons to displace the mouldable material from the holding cavities into the moulding cavities.

4. A method as claimed in claim 3, wherein the screw means comprises a pair of screws.

5. A method as claimed in claim 1 and comprising incorporating a flame retardant in the mouldable material as the plasticizing procedure proceeds.

6. A method of manufacturing moulded articles, the method comprising the steps of:
   continuously running a compounder comprising a compounding barrel which has therein compounding screw means for continuously plasticizing a mouldable material supplied to the compounder in a single plasticizing procedure;
   incorporating reinforcing fibres in the mouldable material as the single plasticizing procedure proceeds and provide a continuous supply of mouldable material with the fibres dispersed in it;
   directing the mouldable material and dispersed fibres emerging from the compounder into a feed path leading from the compounder to at least one barrel;
   urging mouldable material and dispersed fibres out of the barrel and into a moulding cavity by advancing a piston along the barrel in a forward stroke from a retracted position to a forward position, the face of the piston which is leading during the forward stroke becoming part of the bounding wall of the moulding cavity upon the piston reaching the limit of its forward stroke.

7. A method as claimed in claim 6, wherein said mouldable material and fibres are compounded by feeding them to the compounding barrel which has therein the pair of compounding screws.

8. A method as claimed in claim 6, wherein said mouldable material is a synthetic plastics material and the method includes the steps of melting the material in the compounder, feeding the molten mouldable material with the fibres dispersed therein to a heated vessel which maintains the mouldable material in its molten condition, and feeding the molten mouldable material with fibres dispersed therein from said vessel to said moulding cavity.

9. A method of manufacturing moulded articles, the method comprising the steps of:
   continuously running screw means in a screw-means barrel with mouldable material;
   then supplying fibres to the mouldable material in the screw-means barrel with the running screw means for providing mouldable material with said fibres dispersed therein;
   directing the mouldable material with said fibers alternately into first and second barrels;
   urging the mouldable material with said fibres out of the first barrel and into a first moulding cavity by advancing a first piston along the first barrel in a forward stroke from a retracted position to a forward position, a face of the first piston leading during the forward stroke becoming part of a bounding wall of the first moulding cavity when the first piston reaches the forward position thereof; and
   then urging the mouldable material with said fibres out of the second barrel and into a second moulding cavity by advancing a second piston in a forward stroke along the second barrel from a retracted position to a forward position, a face of the second piston leading during the forward stroke becoming part of a bounding wall of the second moulding cavity when the first piston reaches the forward position thereof.

10. An installation for moulding moulded articles, the installation comprising;
   means for supplying mouldable material to a barrel with has therein screw means for continuously plasticising the mouldable material in a single plasticising process and
   means for incorporating reinforcing fibres in the mouldable material as the single plasticising process proceeds, for providing a continuous supply of mouldable material with said fibres dispersed therein;
   means defining a flow path leading from the barrel;
   first and second barrels, said flow path leading from the barrel to the first and second barrels;
   means for feeding the mouldable material with said fibres dispersed therein along the flow path sequentially to the first and second barrels;
   first and second moulding cavities;
   first and second pistons each in a respective one of the first and second barrels and each having a retracted position and a forward position in the respective barrel; and
   means for displacing the pistons sequentially in forward strokes from the retracted positions to the forward positions for displacing mouldable material with said fibres dispersed therein out of the barrels and into the moulding cavities, those faces of the first and second pistons which lead during the forward strokes becoming part of the bounding walls of the associated first and second moulding cavities respectively when the pistons reach the forward ends of their strokes.

11. An installation as claimed in claim 10, wherein the first and second barrels comprise holding cavities between the retracted pistons and the moulding cavities, said holding cavities being sequentially filled and emptied by said pistons as the pistons move from their retracted positions to their forward positions.

12. An installation as claimed in claim 10, wherein said screw means comprises a pair of parallel screws in the barrel.

13. An installation as claimed in claim 11, wherein said screw means comprises a pair of parallel screws in the barrel.

14. An installation as claimed in claim 10 and including a heated vessel in said flow path for receiving molten mouldable material with fibers dispersed therein and maintaining it in a molten state.

15. An installation as claimed in claim 11 and including a heated vessel in said flow path for receiving molten mouldable material with fibers dispersed therein and maintaining it in a molten state.

16. An installation as claimed in claim 11 and including valves which can be opened and closed to control communication between the holding cavities and the moulding cavities, each holding cavity being filled while the respective valve is closed.

17. An installation for moulding moulded articles, the installation comprising;
   a compounder comprising a compounding barrel which has therein compounding screw means for providing a continuous supply of mouldable material with fibres dispersed therein by plasticizing the mouldable material in a single plasticising procedure and incorporating the fibres in the mouldable material as the plasticizing procedure proceeds;
   means for supplying the mouldable material to the compounder;
   means for supplying the fibres to the compounder;
   means defining a flow path leading from the compounder;
   at least one barrel, said flow path leading from the compounder to the barrel;
   means for feeding mouldable material with fibres dispersed therein to the barrel;
   at least one moulding cavity;
   a piston in the barrel, said piston having a retracted position and a forward position in the barrel; and
   means for displacing the pistons in a forward stroke from the retracted positions to the forward positions for displacing mouldable material with fibres dispersed therein out of the barrel and into the moulding cavity, the face of the piston which leads during the forward stroke becoming part of the bounding wall of the moulding cavity when the piston reaches the forward end of its stroke.

18. An installation as claimed in claim 17, wherein said compounding screw means comprises a pair of parallel screws in the compounding barrel for kneading and mixing the mouldable material and fibres.

19. An installation as claimed in claim 17 and including a heated vessel in said flow path for receiving molten mouldable material with fibers dispersed therein from the compounder and maintaining it in a molten state.

* * * * *